United States Patent
Bauer et al.

(10) Patent No.: US 10,114,357 B2
(45) Date of Patent: Oct. 30, 2018

(54) METHODS AND SYSTEMS FOR REMOTELY OPERATING A MACHINE TOOL BY MEANS OF A MOBILE COMMUNICATION DEVICE

(71) Applicant: TRUMPF Werkzeugmaschinen GmbH + Co. KG, Ditzingen (DE)

(72) Inventors: Klaus Bauer, Ditzingen (DE); Christian Goerg, Moeglingen (DE); Andreas Kahmen, Aachen (DE); Manfred Lendle, Ditzingen (DE); David Heisenberg, Leonberg (DE); Rainer Lohrmann, Korntal-Muenchingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 279 days.

(21) Appl. No.: 15/130,451

(22) Filed: Apr. 15, 2016

(65) Prior Publication Data

US 2016/0231724 A1    Aug. 11, 2016

Related U.S. Application Data

(63) Continuation of application No. PCT/EP2014/071762, filed on Oct. 10, 2014.

(30) Foreign Application Priority Data

Oct. 15, 2013 (DE) .................... 10 2013 220 865

(51) Int. Cl.
G05B 19/042 (2006.01)

(52) U.S. Cl.
CPC ............ *G05B 19/0428* (2013.01); *G05B 2219/23043* (2013.01); *G05B 2219/24024* (2013.01)

(58) Field of Classification Search
CPC ...... G05B 19/0428; G05B 2219/23043; G05B 2219/24024
See application file for complete search history.

(56) References Cited

U.S. PATENT DOCUMENTS 8,649,909 B1 * 2/2014 Phillips ............... G05D 7/0676
                                                              700/1
8,831,567 B2    9/2014 Kim et al.
(Continued)

FOREIGN PATENT DOCUMENTS

CN    102273322 A    12/2011
CN    102572093 A    7/2012
(Continued)

OTHER PUBLICATIONS

ITunes Preview, "iTunes is the world's easiest way to organize and add to your digital media collection", iTunes Store, 2013 (see "IPCam").
(Continued)

*Primary Examiner* — Vincent H Tran
(74) *Attorney, Agent, or Firm* — Fish & Richardson P.C.

(57) ABSTRACT

This disclosure describes systems and methods for remotely operating machine tools that include a stationary operating device that can operate in a control mode for controlling the machine tool or in a mode without control authorization. The methods include activating a first communication connection between a mobile communication device and the stationary operating device. The methods also include configuring the stationary operating device to operate in a mode without control authorization. The methods further include transferring control authorization from the stationary operating device to the mobile communication device by configuring the mobile communication device to operate in a remote control mode for controlling the machine tool based on transferred control authorization. The control authoriza-
(Continued)

tion is transferred to the mobile communication device simultaneously or after the stationary operating device is configured to operate in the mode without control authorization based on information that is accessible only locally at the machine tool.

22 Claims, 2 Drawing Sheets

(56) References Cited

U.S. PATENT DOCUMENTS

| | | | |
|---|---|---|---|
| 9,363,855 B2 | 6/2016 | Feri et al. | |
| 2012/0116547 A1* | 5/2012 | Shigehara | G05B 19/0428 700/83 |
| 2013/0024542 A1* | 1/2013 | Keller | G05B 19/0428 709/217 |
| 2013/0262687 A1* | 10/2013 | Avery | G06F 9/54 709/229 |
| 2014/0282924 A1* | 9/2014 | Singhal | H04L 63/0853 726/5 |
| 2015/0058947 A1* | 2/2015 | John | H04W 12/06 726/7 |

FOREIGN PATENT DOCUMENTS

| | | |
|---|---|---|
| DE | 3813590 A1 | 11/1988 |
| DE | 10129567 A1 | 8/2002 |
| DE | 202004013923 U1 | 1/2005 |
| DE | 102005054140 A1 | 5/2006 |
| DE | 102011083817 A1 | 4/2013 |
| DE | 102012005975 A1 | 9/2013 |
| WO | WO2007025396 A1 | 3/2007 |

OTHER PUBLICATIONS

International Search Report for corresponding PCT Application No. PCT/EP2014/071762, dated Jan. 9, 2015, 4 pages.

* cited by examiner

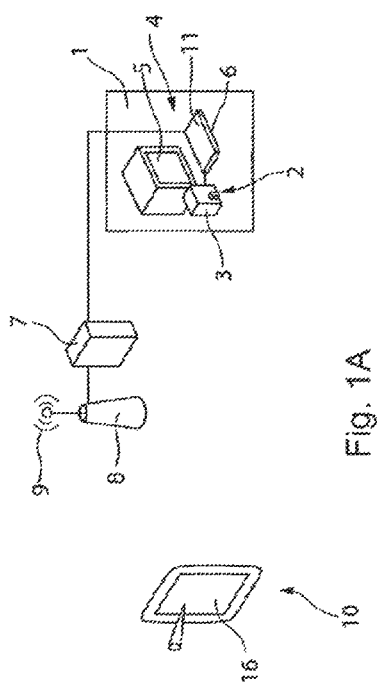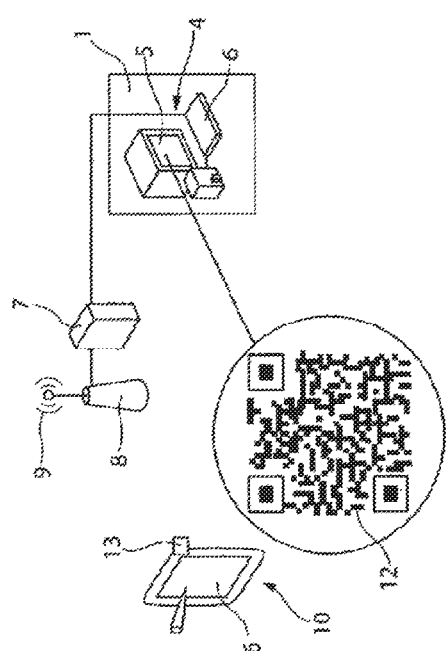

METHODS AND SYSTEMS FOR REMOTELY OPERATING A MACHINE TOOL BY MEANS OF A MOBILE COMMUNICATION DEVICE

CROSS-REFERENCE TO RELATED APPLICATIONS

This application is a continuation of and claims priority under 35 U.S.C. § 120 to PCT Application No. PCT/EP2014/071762 filed on Oct. 10, 2014, which claims priority to German Application No. DE 10 2013 220 865.0, filed on Oct. 15, 2013. The contents of both of these priority applications are hereby incorporated by reference in their entireties.

TECHNICAL FIELD

The present invention relates to methods and systems for remotely operating a machine tool.

BACKGROUND

Mobile communication devices, such as smartphones or tablet computers, are increasingly used in machine tool environments to monitor machine tools and to obtain logistics, service and maintenance information. Such mobile communication devices can also be used to run certain machine tool functions, such as adding and starting new production jobs or running maintenance functions.

SUMMARY

In general, for safety reasons, machine tools should not be controlled remotely, because a machine starting to move or a laser turning on can seriously injure an operator working locally with the machine. Therefore, it is essential that only one user can control the machine tool at a time, and it must be clear to all who this user is at all times. In addition, a first user must not be able to take control of a machine tool remotely unless he or she is at or near the machine, to be able to see whether anyone is in the danger area of the machine tool. Once the first user has remote control of the machine tool with a mobile communication device, a second user must not be able to enter the danger area without triggering safety measures at the machine tool, e.g., light barriers and window/door securing systems, and the second user should not be able to turn off these safety measures, because control is with the first user. The methods and systems described herein relate to remotely operating a machine tool while meeting these safety requirements.

In these new methods and systems the machine tool includes a stationary operating device that can operate in a control mode for controlling the machine tool or in a mode without control authorization by means of a mobile communication device. Furthermore, these methods and systems reliably prevent any simultaneous control (dual operation) of the machine tool by means of the stationary operating device and by the mobile communication device. The mobile communication device can either observe or operate (remotely control) the touch user interface of a machine tool remotely.

To activate the remote control, it is ensured through suitable technical measures that either the mobile operator is located at a defined monitoring point (e.g., a location at which the hazard areas are viewable, which is normally the machine control panel) or a person with visibility of the hazard areas of the machine authorizes the release, and that a confusion of machines is excluded and only the intended machine can be operated. In addition, technical measures are implemented that ensure that these points cannot easily be bypassed. If the mobile operation represents an increased safety risk despite these measures in special situations, e.g., during repair work, the mobile operation functionality can be deactivated at any time. The status of the mobile communication device is displayed on the control panel by means of a suitable visualization.

The activation of the communication connection and the transfer of the control authorizations can be performed on the machine tool. According to the present disclosure, the mobile communication device is switched to its remote control mode only by means of information that is retrievable locally from the machine tool. In its remote control mode, the mobile communication device can furthermore be connected to the machine controller of the machine tool exclusively indirectly via the stationary operating device.

The mobile communication device is most simply connected to the machine tool, in particular to the stationary operating device, via a radio network, e.g., via a wireless local area network (WLAN).

The mode without control authorization can have safety-related control functions, which the remote control mode of the mobile communication device does not have, and the control authorizations, with the exception of the safety-related control functions, are transferred in step c) from the stationary operating device to the mobile communication device. Safety-related control functions, for example, emergency stop, feed stop, acknowledge feed stop, program start, program reset, and acknowledge light barrier, remain permanently with the stationary operating device and can therefore be triggered by corresponding buttons exclusively on the stationary operating device or at a location where the machine tool is viewable. A simple consumer device without an emergency stop switch or other safety-related control functions, e.g., a tablet computer, can therefore be used as a communication device. The restrictions for the user of the communication device are minimal, even though he or she is working with a consumer device.

At least one functional area of the machine tool can be recorded by means of at least one camera, and the recorded functional area and the currently displayed machine user interface of the machine tool are transferred to the mobile communication device and are displayed there simultaneously, in particular next to or overlaid over one another. The operator can remotely control the machine tool on the basis of the information displayed on the mobile communication device, even if he has no direct view of the functional area.

The recorded images can be overlaid partially transparently over the machine user interface so that both the images of the camera and the overlapped machine user interface can be seen simultaneously. The machine user interface can be disposed in the background, so that the machine user interface can be operated directly in the areas not overlaid by camera images. The camera images of the presented functional area may be moved, for example, by touching the camera images on the communication device designed as a touchscreen and by moving the touch point so that the camera images are no longer overlaid over areas of the machine user interface and the machine user interface can be operated in these areas that are no longer overlaid. In particular, the size of the presented camera images can be changed, for example by a touch gesture with two fingers (pinch-to-zoom).

In another aspect, the invention relates to systems for remotely operating a machine tool with the features described herein.

Finally, the invention also relates to a radio-network-enabled, in particular WLAN-enabled, mobile communication devices as described herein. The communication device may, for example, be a correspondingly programmed smartphone or tablet computer that consequently has no emergency stop switch. By means of the mobile communication device, a simple upgrade is possible for machines for which the use of a remote control was not originally intended.

Further advantages of the inventions described herein can be found in the claims, the description, and the drawings. The features mentioned above and described below can similarly be used separately or jointly in any given combinations. The embodiments shown and described are not to be understood as a definitive listing, but rather as examples illustrating the invention.

In one aspect, the disclosure includes methods for remotely controlling a machine tool comprising a stationary operating device that can operate in a control mode for controlling the machine tool or in a mode without control authorization. The methods include activating a first communication connection between a mobile communication device and the stationary operating device. The method also includes configuring the stationary operating device to operate in a mode without control authorization. The method further includes transferring control authorization from the stationary operating device to the mobile communication device by configuring the mobile communication device to operate in a remote control mode for controlling the machine tool based on transferred control authorization. The control authorization is transferred to the mobile communication device simultaneously or after the stationary operating device is configured to operate in the mode without control authorization based on information that is accessible only locally at the machine tool.

In some implementations of the methods, a control signal for controlling the machine tool is transmitted from the mobile communication device to the machine tool through the first communication connection. In other implementations of the methods, the first communication connection is activated at the machine tool.

In some implementations of the methods, the mobile communication device is configured to operate in the remote control mode by exchanging data by means of the first communication connection between the mobile communication device and the stationary operating device. The information is communicated to the mobile communication device either when the first communication connection is activated or in a step separate from the transfer of control authorization, when the first communication connection is already established. In other implementations of the methods, the mobile communication device, in the remote control mode, is connected only via the stationary operating device to a machine controller of the machine tool. In some implementations of the methods, the mobile communication device is connected to the stationary operating device by a Remote Desktop Protocol communication connection. In other implementations of the method, the mobile communication device is configured to operate in the remote control mode by one or more of receiving a personal identification number (PIN), scanning a Quick Response (QR) code, exchanging data by means of the first communication connection between the mobile communication device and the stationary operating device, and exchanging data by means of a second communication connection between the mobile communication device and the stationary operating device. In other implementations of the methods, the second communication connection comprises Near Field Communication (NFC) or Bluetooth.

In some implementations of the methods, the radio network is a wireless local area network. In other implementations of the methods, the mode without control authorization comprises safety-related functions and the control authorization of the remote control mode of the mobile communication device does not include safety-related functions. In yet other implementations of the methods, at least one functional area of the machine tool is recorded by at least one camera and information related to the at least one functional area and information related to a machine user interface of the machine tool are transferred to the mobile communication device.

In some implementations of the method, the information related to the at least one functional area and the information related to a machine user interface of the machine tool are displayed on a display device of the mobile communication device. In other implementations of the methods, the information related to the at least one functional area and the information related to a machine user interface of the machine tool are displayed simultaneously either next to one another or overlaid over another on the display device.

In one aspect, the disclosure includes systems for remotely operating a machine tool. The systems includes a stationary operating device configured to operate in a control mode for controlling the machine tool or in a mode without control authorization. The systems are configured to activate a first communication connection between a mobile communication device and the stationary operating device. The systems are configured to configure the stationary operating device to operate in a mode without control authorization. The systems are also configured to transfer control authorization from the stationary operating device to the mobile communication device by configuring the mobile communication device to operate in the remote control mode for controlling the machine tool based on transferred control authorization. The control authorization is transferred to the mobile communication device, simultaneously or after the stationary operating device is configured to operate in the mode without control authorization based on information that is accessible only locally at the machine tool.

In one implementation, a control signal for controlling the machine tool is transmitted from the mobile communication device to the machine tool through the first communication connection. In another implementation, the first communication connection is activated at the machine tool.

In one implementation, the mobile communication device is configured to operate in the remote control mode by exchanging data by means of the first communication connection between the mobile communication device and the stationary operating device, and wherein the information is communicated to the mobile communication device either when the first communication connection is activated or in a step separate from the transfer of control authorization, when the first communication connection is already established. In one implementation, the information is communicated to the mobile communication device, in a separate step from the transfer of control authorization, through the first communication connection. In another implementation, the mobile communication device, in the remote control mode, is connected only via the stationary operating device to a machine controller of the machine tool.

In one implementation, the mobile communication device is connected to the stationary operating device by a Remote Desktop Protocol communication connection. In another implementation the mobile communication device is configured to operate in the remote control mode by one or more of receiving a personal identification number (PIN), scanning a Quick Response (QR) code, exchanging data by means of the first communication connection between the mobile communication device and the stationary operating device, and exchanging data by means of a second communication connection between the mobile communication device and the stationary operating device. In yet another implementation, the second communication connection comprises Near Field Communication (NFC) or Bluetooth.

In one implementation, the first communication connection is via a radio network. In another implementation, the radio network is a wireless local area network. In another implementation, the mode without control authorization comprises safety-related functions and the control authorization of the remote control mode of the mobile communication device does not include safety-related functions. In yet another implementation, at least one functional area of the machine tool is recorded by at least one camera and information related to the at least one functional area and information related to a machine user interface of the machine tool are transferred to the mobile communication device.

In one implementation, the information related to the at least one functional area and the information related to a machine user interface of the machine tool are displayed on a display device of the mobile communication device. In another implementation, the information related to the at least one functional area and the information related to a machine user interface of the machine tool are displayed simultaneously either next to one another or overlaid over another on the display device.

In one implementation, the systems include a display device that includes a touch screen, and a control device configured to set up the first communication connection by the radio network and to be operated by the mobile communication device in the remote control mode. The mobile communication device controls the machine tool via the display device via the first communication connection.

DESCRIPTION OF DRAWINGS

FIG. 1A is a schematic diagram that illustrates a laser processing system including a machine tool that can communicate with a mobile communication device through an access point.

FIG. 1B is a schematic diagram that illustrates local radio network access of data of the laser processing system.

DETAILED DESCRIPTION

Figure 1C:
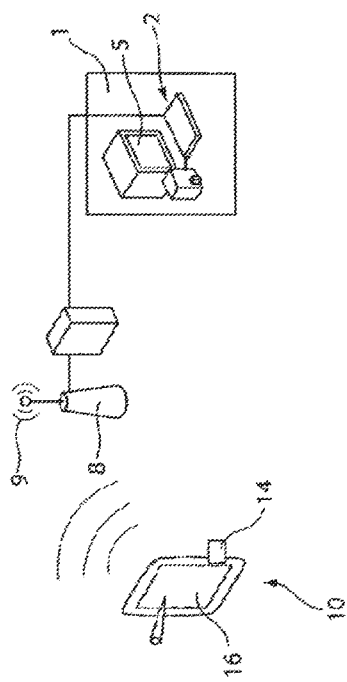
FIG. 1C is a schematic diagram that illustrates the laser processing system wherein the mobile communication device is connected to the local radio network.

FIG. 1A is a schematic illustration of a laser processing system comprising a machine tool 1 that can communicate with a mobile communication device 10 through an access point 8. The machine tool 1 can, for example, be a machine for two dimensional (2D) or three dimensional (3D) laser cutting or welding, for laser tube cutting, for punching, for punch laser processing, or for bending work pieces. The machine tool 1 is controlled by a machine controller 2 which, on the hardware side, comprises a Man Machine Communication (MMC) operating system that has a control computer 3 (e.g., an industry standard personal computer (IPC)), and a stationary operating device ("main control panel") 4 with a screen as a machine user interface 5, and with an input unit 6 (keyboard, mouse, or touch panel).

The machine tool 1 may communicate with an access point 8, via a firewall 7, to set up a wireless local radio network 9, for example, a Wireless Local Area Network (WLAN). A service technician, a machine operator, or an authorized person (e.g., an authorized person in situ) can wirelessly connect to the local radio network 9 of the machine tool 1 using a mobile communication device 10, e.g., a WLAN-enabled mobile communication device 10 (also referred to herein as a "mobile remote control"), and gain access to the machine controller 2. The mobile communication device 10 may be a portable remote control device, for example, a smartphone or tablet computer that is configured to communicate to local radio network 9 as described herein.

The stationary operating device 4 can be configured to operate in a control mode for controlling the machine tool 1, and a mode without control authorization that can allow safety-related control functions (e.g., an emergency stop function) to be controlled from the operating device 4. The mobile communication device 10 may be configured to operate in a remote control mode for controlling the machine tool 1, for example, when the stationary operating device 4 is configured to (previously or simultaneously) operate in the mode without control authorization. The mobile communication device 10 may also be configured to operate in a mode without control authorization for monitoring the machine. In one implementation, the stationary operating device 4 can request information (e.g., login information) from the mobile communication device 10 before the mobile communication device 10, configured in the remote control mode, is allowed to control the operation of machine tool 1.

In one implementation, the mobile communication device 10 is configured to operate in the remote control mode based on access information (e.g., machine-readable or human-readable access information) that is stored locally on the machine tool 1 that can be retrieved by mobile communication device 10. In one implementation, the access information can be created on the control computer 3, and can be presented on the machine user interface 5 in clear text or as a QR code. The access information may be transferred to or retrieved by the mobile communication device 10, for example, through input or reading/scanning by a camera. Additionally or alternately, access information can be transferred from the machine tool 1 to the mobile communication device 10 by means of Near Field Communication (NFC) or Bluetooth. For example, the access information can be transferred through a communication connection (e.g., local radio network 9) that may have been established between the mobile communication device 10 and the machine tool 1 (via stationary operating device) prior to the transfer of access information. In one implementation, the access information can be transferred in a separate step if a communication connection (e.g., Wi-Fi) already exists between the mobile communication device 10 and the stationary operating device 4. For example, the access information can be transferred through the communication connection that already exists, or can be transferred through a second, different communication connection. The communication connection between the mobile communication device 10 and the stationary operating device 4 can be set up without the access information, which may be stored locally on the machine tool 1, being retrieved by the mobile communication device 10. This may be done, for example, when it is desirable to monitor and not remotely control the machine tool 1.

In another implementation, the access information can be used to configure the mobile communication device 10 in the remote control mode, and furthermore to set up a communication connection 15, e.g., a secure communication connection, with the machine tool 1. The settings of the communication connection 15 may be configured so that the connection is valid when, for example, WLAN keys are used.

The machine tool 1 can be remotely controlled by the mobile communication device 10 by one or more of the following steps. A communication connection 15 between the mobile communication device 10 and the stationary operating device 4 is activated. The stationary operating device 4 is configured to operate in the mode without control authorization that enables the safety-related control functions to be controlled from the stationary operating device 4. The control authorizations (with the exception of the safety-related functions) is transferred from the stationary operating device 4 to the mobile communication device 10. This can be done, for example, by configuring the mobile communication device 10 to operate in the remote control mode for controlling the machine tool 1. The mobile communication device 10 can be configured to operate in the remote control mode simultaneously or after the stationary operating device 4 is configured to operate in the mode without control authorization. The safety-related functions whose control authorization cannot be transferred to the mobile communication device 10 can include, for example, an emergency stop function.

The communication connection 15 between the mobile communication device 10 and the machine tool 1 can be activated, for example, by one or more of a service technician, a machine operator or a different authorized person (e.g., an authorized person in situ). The service technician can notify the machine tool 1 by pressing a softkey 11 that may also be designed, for example, as a softkey of a touch screen, on the machine tool 1. The machine tool 1 can generate a random code (a password, QR code, etc.) and sets the encryption based on the random code accordingly on its access point 8. After this configuration of the access point 8, the machine tool 1 activates the local radio network 9 through the access point 8 (FIG. 1A).

FIG. 1B schematically illustrates the local radio network access data (QR code 12) of the laser processing system. The machine tool 1 may display the local radio network access data (that may be needed by the mobile communication device 10 to communicate with machine tool 1) on the machine user interface 5. The access data (e.g., WLAN access data) can be the form of a PIN code or a machine-readable QR code 12. The service technician may detect (e.g., optically) the access data with a camera 13 of his mobile communication device 10 (FIG. 1B). The machine controller 2 can be programmed to generate new local radio network access data before each set-up of the wireless connection.

FIG. 1C schematically illustrates the laser processing system wherein the mobile communication device 10 is connected to the local radio network 9. The mobile communication device 10 can decode the optically detected access data and establish a connection to the local radio network 9 of the machine tool 1. Once the connection to the local radio network has been established, the access data (e.g., machine-readable QR code 12 or pin code) can be removed from the machine user interface 5.

Figure 1D:
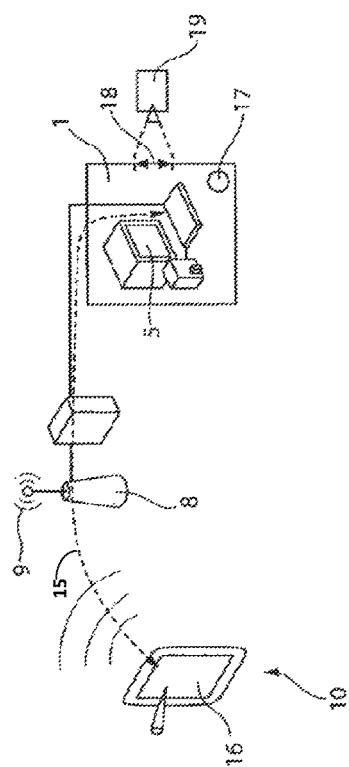
FIG. 1D is a schematic diagram that illustrates the laser processing system wherein the mobile communication device communicates with a stationary operating device through a communication connection.

FIG. 1D schematically illustrates the laser processing system wherein the mobile communication device 10 is communicating with the stationary operating device 4 through the communication connection 15. In some implementations, the mobile communication device 10 can include a control device 14 that is programmed to set up a communication connection 15 (e.g., radio network connection) to the local radio network 9 using the detected local radio network access data. The communication connection 15 between the mobile communication device 10 and the stationary operating device 4 is indicated in FIG. 1D by a dotted arrow. The communication connection 15 may, for example, be a Remote Desktop Protocol communication connection.

Once the communication connection 15 is activated, the stationary operating device 4 is configured, by the machine controller 2, to operate in the mode without control authorization that allow the safety-related control functions to be controlled by the stationary operating device 4. The mobile communication device 10 may then be switched to the remote control mode for controlling the machine tool 1. As a result, control authorization, with the exception of the safety-related functions, can be transferred from the stationary operating device 4 to the mobile communication device 10. The machine tool 1 may then be remotely controlled, for example, via an operating/display device 16 (e.g., a touch-screen of the mobile communication device 10) wherein the mobile communication device 10 is connected in its remote control mode via the stationary operating device 4 to the machine controller 2 of the machine tool 1.

The safety-related control functions (e.g. emergency stop, feed stop, acknowledge feed stop, program start, program reset, acknowledge light barrier, etc.) can be controlled with the stationary operating device 4, and can therefore be triggered by inputs (e.g., buttons) related to the control functions that are associated with the stationary operating device 4 (e.g., the inputs are located where the machine tool 1 is viewable).

In FIG. 1D, an emergency stop switch 17 that represents the safety-related control functions is present on the machine tool 1. A simple consumer device (e.g., a "smart" telephone, personal digital assistant, or tablet computer) can be used as the mobile communication device 10. The mobile communication device 10 may include, for example, apps that allow the mobile communication device 10 and machine tool 1 to interact. As a result, any restrictions for the user of the mobile communication device 10 are minimal, even though he or she is working with a standard consumer device. Old machines can simply be upgraded by means of the mobile communication device 10.

As shown in FIG. 1D, a functional area 18 (or a plurality of functional areas) of the machine tool 1 may be recorded by means of a camera 19 (or a plurality of cameras). Information related to the recorded images of functional area 18 and the machine user interface 5 of the machine tool 1 is communicated to the mobile communication device 10. This information can be presented to a user of the mobile communication device 10, for example, through a display that presents the information. For example, the recorded images and an image of the machine user interface 5 may be presented next to or overlaid over one another.

In one implementation, the recorded images can be overlaid partially transparently over the image of the machine user interface 5 so that both the images can be seen simultaneously. The image of the machine user interface 5 can be disposed in the background, so that it can be operated directly in the areas not overlaid by recorded images. The recorded images of the functional area 18 can be moved, for example, by touching the recorded images on the touchscreen display of mobile communication device 10 and by moving the touch point so that the recorded images are no longer overlaid over areas of the image of the machine user interface 5. The machine user interface 5 can be operated in the areas that are no longer overlaid. In one implementation, the size of the presented recorded images can be changed, for example by a touch gesture with two fingers (pinch-to-zoom).

For the remote control, using Remote Desktop Sharing Protocols (e.g., virtual network computing (VNC), real-time transport protocol (RTP), pcAnywhere, etc.), the image/screen content of the stationary operating device 4 ("main control panel") of the machine tool 1 is displayed in the mobile communication device 10 (also referred to as a "remote control" device), and the operating functions (e.g., inputs from mouse, touchscreen, keyboard, etc.) associated with the mobile communication device 10 are forwarded to the stationary operating device 4. With this type of remote control, no distinction can be made between actions that trigger movements on the machine tool 1 and actions that are used for navigation within the operating software of the mobile communication device 10.

Several modes of operation of the mobile communication device 10 can exist. For example, in the observation mode, operating functions of the mobile communication device 10 are blocked and control of operation of machine tool 1 may be possible on the stationary operating device 4. In the remote control mode, operating functions of the mobile communication device 10 are forwarded to the stationary operating device 4 and control of operation of machine tool 1 may be blocked on the stationary operating device 4, with the exception of operations related to safety-related control functions. As a result, the operation of machine tool 1 (with the exception of operations related to safety-related control functions) can be controlled either by the mobile communication device 10 or the stationary operating device 4.

The mobile communication device 10 connects to the local radio network 9 of the machine tool 1. The local radio network 9 emits an SSID that contains information related to the identity of the machine tool, for example, the number or the nickname of the machine tool 1. When the mobile communication device 10 is switched on, it is automatically in observation mode. In order to configure the mobile communication device 10 to operate in the remote control mode, the mobile communication device 10 must be coupled to the machine tool 1 in an unambiguous fashion and the control of the stationary operating device 4 must be transferred to the mobile communication device 10. This can happen, for example, via access data (e.g., a dynamic QR code, pin code etc.) that is presented on the machine user interface 5 of the stationary operating device 4 and can be scanned with the camera of the mobile communication device 10. The mobile communication device 10 may communicate the access code back to the machine tool 1 that can determine whether the request to operate the machine tool 1 remotely is permissible. As an alternative to permanently mounted mobile communication device 10 or mobile communication device 10 without a camera, a dynamic PIN is offered which is displayed on the machine user interface 5 as an alternative to the QR code and can be entered on the mobile communication device 10. If the mobile communication device 10 is in remote control mode, operation is not possible on the stationary operating device 4, with the exception of safety-related functions. In the case of inputs local to the control panel 4, a warning message is displayed containing an option for returning the control of the operation of machine tool 1 to the control panel 4.

If the operation is returned to the stationary operating device 4, the remote control is paused. Only observation is then possible on the mobile communication device 10. However, in the paused state, it may be possible to switch the mobile communication device 10 once more to remote control mode or to the observation mode without the QR code via the softkey 11. Once in observation mode, the mobile communication device 10 may have to authenticate itself on the machine tool 1 in order to switch to remote control mode. If the mobile communication device 10, when set to operating mode, leaves the local radio network reception area, a warning message is shown on the mobile communication device 10 and the last received image of the machine user interface 5 is displayed. The operation of the stationary operating device 4 then remains blocked so that, if the mobile communication device 10 re-enters the local radio network reception area, remote operation is again possible.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for remotely controlling a machine tool comprising a stationary operating device that can operate in a control mode for controlling the machine tool or in a mode without control authorization, the method comprising:
   a) activating a first communication connection between a mobile communication device and the stationary operating device;
   b) configuring the stationary operating device to operate in a mode without control authorization; and
   c) transferring control authorization from the stationary operating device to the mobile communication device by configuring the mobile communication device to operate in a remote control mode for controlling the machine tool based on information that is accessible only locally at the machine tool,
   wherein, the control authorization is transferred to the mobile communication device simultaneously or after the stationary operating device is configured to operate in the mode without control authorization, and wherein the control mode comprises safety-related functions that are not transferred to the mobile communication device when the control authorization is transferred from the stationary operating device to the mobile communication device.

2. The method of claim 1, wherein a control signal for controlling the machine tool is transmitted from the mobile communication device to the machine tool through the first communication connection.

3. The method of claim 1, wherein the mobile communication device is configured to operate in the remote control mode by exchanging data by means of the first communication connection between the mobile communication device and the stationary operating device, and wherein the information is communicated to the mobile communication device either when the first communication connection is activated or in a step separate from the transfer of control authorization, when the first communication connection is already established.

4. The method of claim 1, wherein the mobile communication device, in the remote control mode, is connected only via the stationary operating device to a machine controller of the machine tool.

5. The method of claim 4, wherein the mobile communication device is connected to the stationary operating device by a Remote Desktop Protocol communication connection.

6. The method of claim 1, wherein the mobile communication device is configured to operate in the remote control mode by one or more of receiving a personal identification number (PIN), scanning a Quick Response (QR) code, exchanging data by means of the first communication connection between the mobile communication device and the stationary operating device, and exchanging data by means of a second communication connection between the mobile communication device and the stationary operating device.

7. The method of claim 6, wherein the second communication connection comprises Near Field Communication (NFC) or Bluetooth.

8. The method of claim 1, wherein at least one functional area of the machine tool is recorded by at least one camera and information related to the at least one functional area and information related to a machine user interface of the machine tool are transferred to the mobile communication device.

9. The method of claim 8, wherein, the information related to the at least one functional area and the information related to a machine user interface of the machine tool are displayed on a display device of the mobile communication device.

10. The method of claim 9, wherein, the information related to the at least one functional area and the information related to a machine user interface of the machine tool are displayed simultaneously either next to one another or overlaid over another on the display device.

11. A system for remotely operating a machine tool comprising:
a stationary operating device configured to operate in a control mode for controlling the machine tool or in a mode without control authorization;
wherein, the system is configured to:
activate a first communication connection between a mobile communication device and the stationary operating device;
configure the stationary operating device to operate in a mode without control authorization; and
transfer control authorization from the stationary operating device to the mobile communication device by configuring the mobile communication device to operate in the remote control mode for controlling the machine tool based on information that is accessible only locally at the machine tool,
wherein, the control authorization is transferred to the mobile communication device, simultaneously or after the stationary operating device is configured to operate in the mode without control authorization, and wherein the control mode comprises safety-related functions that are not transferred to the communication device when the control authorization is transferred from the stationary operating device to the communication device.

12. The system of claim 11, wherein a control signal for controlling the machine tool is transmitted from the mobile communication device to the machine tool through the first communication connection.

13. The system of claim 11, wherein the mobile communication device is configured to operate in the remote control mode by exchanging data by means of the first communication connection between the mobile communication device and the stationary operating device, and wherein the information is communicated to the mobile communication device either when the first communication connection is activated or in a step separate from the transfer of control authorization, when the first communication connection is already established.

14. The system of claim 11, wherein the information is communicated to the mobile communication device, in a separate step from the transfer of control authorization, through the first communication connection.

15. The system of claim 11, wherein the mobile communication device, in the remote control mode, is connected only via the stationary operating device to a machine controller of the machine tool.

16. The system of claim 15, wherein the mobile communication device is connected to the stationary operating device by a Remote Desktop Protocol communication connection.

17. The system of claim 11, wherein the mobile communication device is configured to operate in the remote control mode by one or more of receiving a personal identification number (PIN), scanning a Quick Response (QR) code, exchanging data by means of the first communication connection between the mobile communication device and the stationary operating device, and exchanging data by means of a second communication connection between the mobile communication device and the stationary operating device.

18. The system of claim 17, wherein the second communication connection comprises Near Field Communication (NFC) or Bluetooth.

19. The system of claim 11, wherein at least one functional area of the machine tool is recorded by at least one camera and information related to the at least one functional area and information related to a machine user interface of the machine tool are transferred to the mobile communication device.

20. The system of claim 19, wherein, the information related to the at least one functional area and the information related to a machine user interface of the machine tool are displayed on a display device of the mobile communication device.

21. The system of claim 20, wherein, the information related to the at least one functional area and the information related to a machine user interface of the machine tool are displayed simultaneously either next to one another or overlaid over another on the display device.

22. The system of claim 11, further comprising:
a display device that comprises a touch screen, and
a control device configured to set up the first communication connection by the radio network and to be operated by the mobile communication device in the remote control mode, wherein the mobile communication device controls the machine tool via the display device via the first communication connection.

* * * * *